(12) United States Patent
Tabata et al.

(10) Patent No.: US 7,483,578 B2
(45) Date of Patent: Jan. 27, 2009

(54) IMAGE DATA DECODING APPARATUS AND METHOD

(75) Inventors: Sunao Tabata, Mishima (JP); Nobuhiko Nakahara, Susono (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 691 days.

(21) Appl. No.: 11/226,417

(22) Filed: Sep. 15, 2005

(65) Prior Publication Data
US 2007/0058875 A1  Mar. 15, 2007

(51) Int. Cl.
G06K 9/36 (2006.01)
(52) U.S. Cl. .................. 382/233; 382/232; 382/239
(58) Field of Classification Search ............. 382/232, 382/233, 239; 358/474, 1.6, 1.9, 500, 462; 345/603, 604; 386/68, 111; 348/E5.1, E5.109; 375/240.18, 240.11
See application file for complete search history.

(56) References Cited

U.S. PATENT DOCUMENTS

| | | | |
|---|---|---|---|
| 6,009,236 A * | 12/1999 | Mishima et al. | 386/111 |
| 6,134,382 A * | 10/2000 | Mishima et al. | 386/68 |
| 6,154,569 A | 11/2000 | Sakaue et al. | |
| 6,342,950 B1 | 1/2002 | Tabata et al. | |
| 6,400,768 B1 * | 6/2002 | Nagumo et al. | 375/240.18 |
| 6,549,717 B2 * | 4/2003 | Mishima et al. | 386/68 |
| 6,587,505 B1 * | 7/2003 | Nozawa et al. | 375/240 |
| 7,340,150 B2 * | 3/2008 | Mishima et al. | 386/68 |
| 7,343,083 B2 * | 3/2008 | Mishima et al. | 386/68 |
| 2005/0030569 A1 | 2/2005 | Tabata et al. | |

FOREIGN PATENT DOCUMENTS

| | | |
|---|---|---|
| JP | 6-22289 A | 1/1994 |
| JP | 11-312173 A | 11/1999 |
| JP | 2003-338934 A | 11/2003 |

OTHER PUBLICATIONS

U.S. Appl. No. 11/019,986, filed Dec. 23, 2004, Tabata et al.
U.S. Appl. No. 11/225,196, filed Sep. 14, 2005, Tabata et al.

* cited by examiner

Primary Examiner—Anh Hong Do
(74) Attorney, Agent, or Firm—Foley & Lardner LLP

(57) ABSTRACT

An image data decoding apparatus decoded synthesized-compressed data in which image data with a plurality of resolutions is compressed in block units by different compression systems, respectively, and each compressed data is synthesized to a single piece of compressed data.

The image data decoding apparatus comprises a separating section 1005-1 for separating the synthesized-compressed data to compressed data with every resolution, decoding sections 1005-2, 1005-3 for decoding separated and compressed data with a first resolution to obtain first high-resolution data and also decoding compressed data with a second resolution obtained from the separating section to obtain first low-resolution data, a conversion section 1005-4 for converting the first low-resolution data into second high-resolution data, and an image synthesis section 1005-5 for synthesizing the first and the second high-resolution data to obtain a decoded image signal.

15 Claims, 16 Drawing Sheets

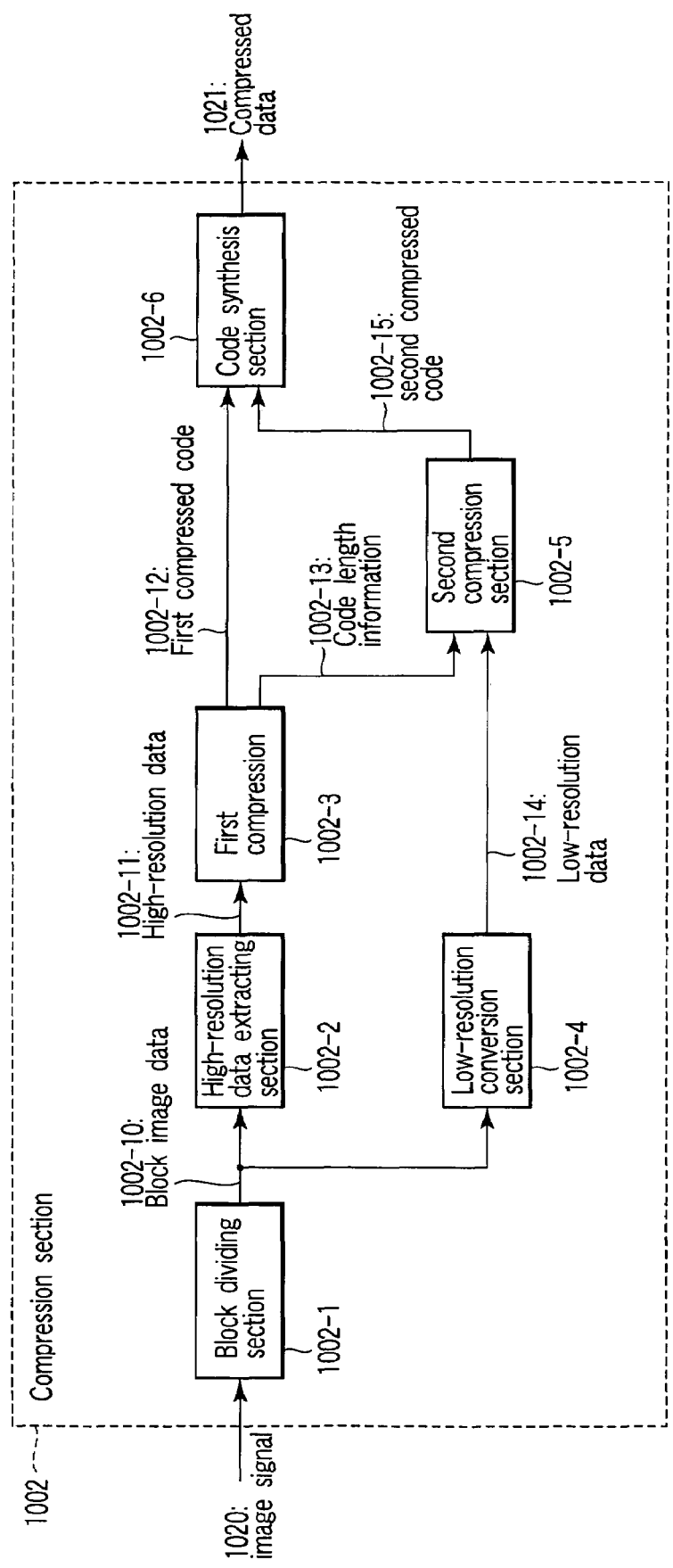
F I G. 2

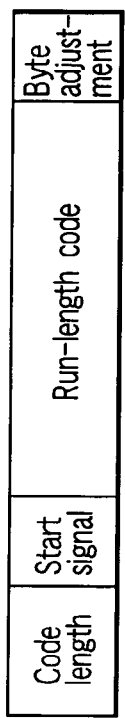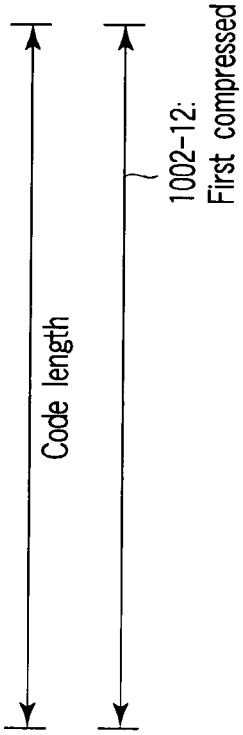
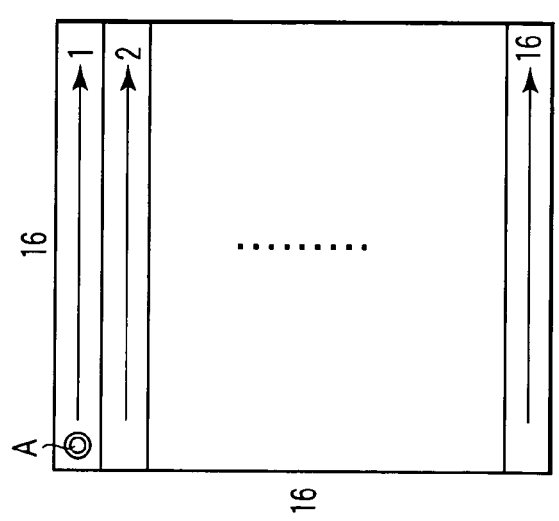
FIG. 5A
FIG. 5B
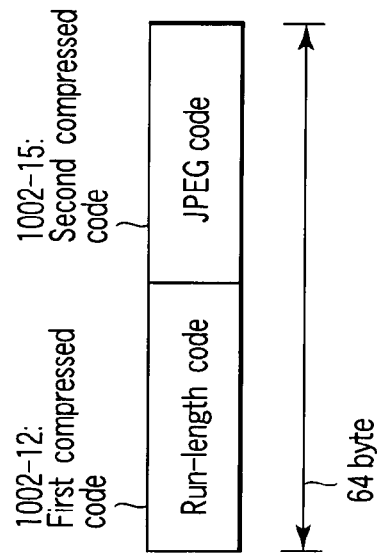
FIG. 6

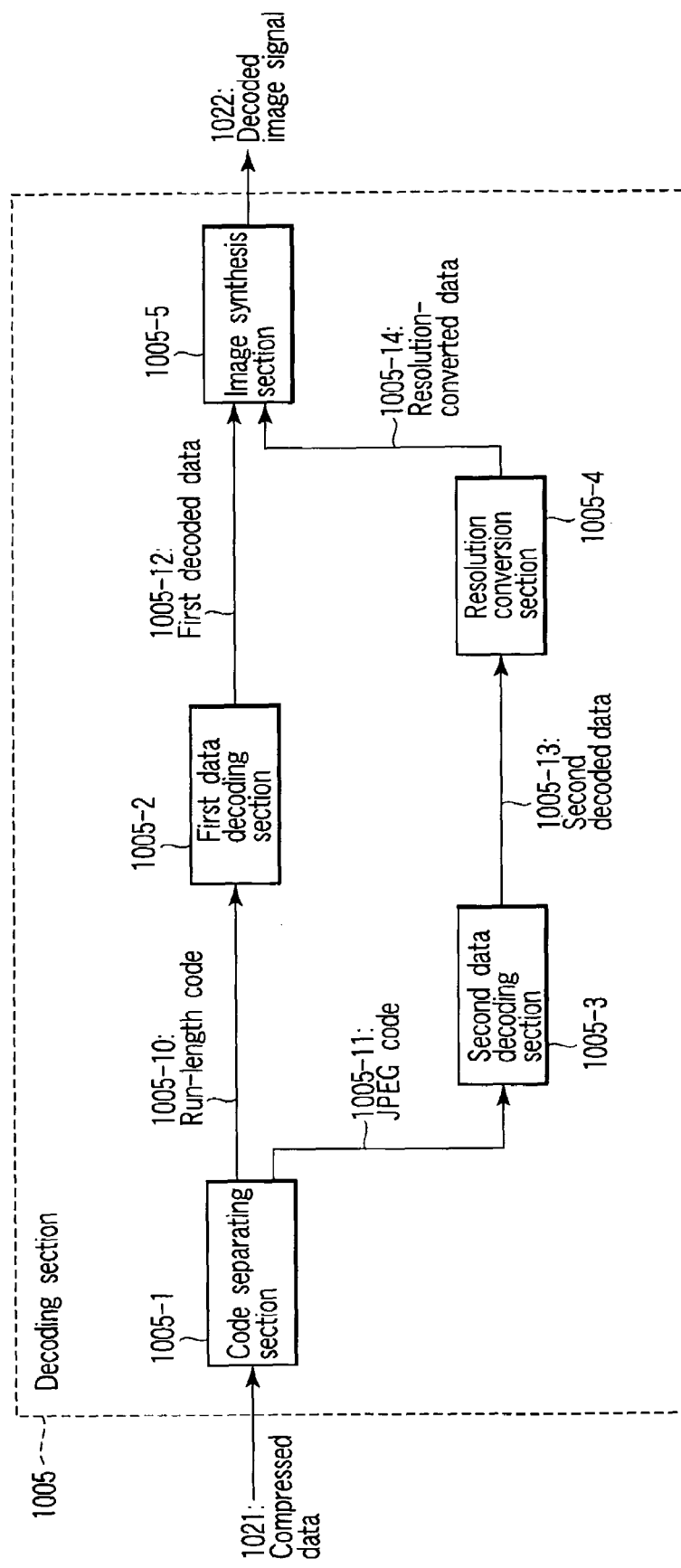
F I G. 8

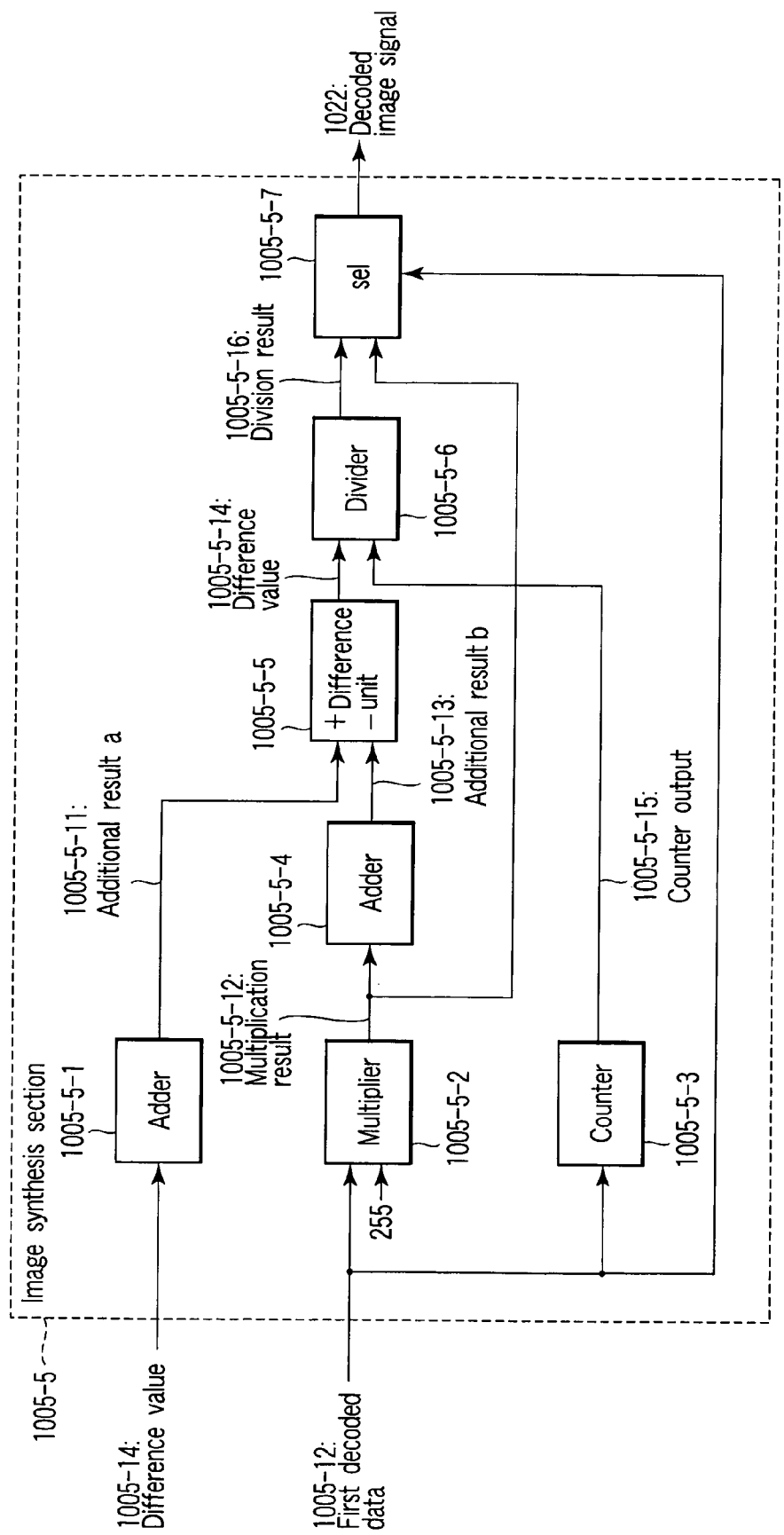
F I G. 9

IMAGE DATA DECODING APPARATUS AND METHOD

BACKGROUND OF THE INVENTION

1. Field of the Invention

The present invention relates to an image data decoding apparatus and a method, and more particularly to an apparatus and a method effective to be applied to an image processing apparatus such as a copying apparatus, a printing apparatus and an image reading apparatus.

2. Description of the Related Art

Since image information becomes large capacity, the image information is usually used in a manner of compression and storage thereof. In addition, in the field of a copying machine and a printer, the image information has been becoming larger in capacity than 1,200 dpi/2,400 dpi, etc., so as to output characters, etc., with high-definition.

Compression techniques for processing such large-capacity data are disclosed by the following documents.

The technique disclosed by the document 1 (Jpn. Pat. Appln. KOKAI Publication No. 11-312173) can store a low-resolution image with a reduced resolution of an original image in addition to the original image. This technique utilizes the low-resolution image instead of the original image in image retrieval, etc., to make a large-capacity image easy to be processed.

The method disclosed by the document 2 (Jpn. Pat. Appln. KOKAI Publication No. 06-22289) is a technique for hierarchically encoding and decoding a moving image in relation to a resolution. Here, the method improves an encoding efficiency and also makes data with an arbitrary resolution possible to be processed by using the low-resolution image in high-resolution image compression.

In the document 3 (Jpn. Pat. Appln. KOKAI Publishing No. 2003-338934), an image in which character parts are extracted from an original image and an image in which a character area is removed from the original image are created. The character area is digitized to conduct MMR compression processing, and the image in which the character area is removed from the original image is resolution-converted to be compressed in a JPEG method and efficiently compressed.

The document 4 (previous U.S. patent application Ser. No. 11/019,986) is the invention previously applied by the inventor of the present invention and the technique in the document 4 achieves a high compression by performing lossless/lossy mixed encoding to a high-definition image of the printer or the like.

BRIEF SUMMARY OF THE INVENTION

The technique disclosed by the document 1 does not get onto the compression itself for an image having been brought into a high definition. The technique disclosed by the document 2 has a possibility to make its processing circuit large in size because high-resolution data is image-compressed/decoded by using correlativity of low-resolution data. And in the technique disclosed by the document 2, the same system is used for both processing of the high-resolution data and the low-resolution data, so that, the compression system is not appropriate for the processing, it is necessary for extraction of data with a prescribed resolution to decode the data together with one with a low resolution.

The technique disclosed by the document 3 easily extracts data at every resolution unit but requires to entirely decode the low- and high-resolution data for processing an integrated image.

The technique disclosed by the document 4 does not get onto the resolution.

An object of the present invention is to provide an image data decoding apparatus and a method for efficiently decoding compressed data compressed by compression systems different for the high-resolution data and the low-resolution data so as to solve such conventional problems described above.

In an aspect of the present invention, an image data decoding apparatus for decoding synthesized-compressed data in which image data with a plurality of resolutions is compressed in block units by different compression systems, respectively, and each compressed data is synthesized to a single piece of compressed data, comprising: a separating section for separating the synthesized-compressed data into compressed data with each resolution; a decoding section for decoding compressed data with a first resolution obtained from the separating section to obtain first high-resolution data and also decoding compressed data with a second resolution obtained from the separating section to obtain first low-resolution data; a conversion section for converting the first low-resolution data into second high-resolution data; and an image synthesis section for synthesizing the first and the second high-resolution data to obtain a decoded image signal is provided.

In another aspect of the present invention, an image data decoding apparatus for decoding first synthesized-compressed data in which image data with a plurality of resolutions is compressed in block units in different compression systems, respectively, so that each compressed data is synthesized to a single piece of compressed data and second synthesized-compressed data with the same form as that of the first synthesized-compressed data in which image data with the same resolution is compressed in units block by different compression systems, respectively, so that each compressed data is synthesized to a single piece of compressed data, comprising: a separating section for separating the first synthesized-compressed data into lossless data and lossy data; a first decoding section for decoding the lossless data obtained from the separation section to obtain first decoded data; a second decoding section for decoding the lossy data obtained from the separation section to obtain second decoded data; a conversion section for converting the second decoded data into resolution-converted data with a high resolution; a selector for selecting to output either the resolution-converted data from the conversion section or the second decoded data from the second decoding section; and an image synthesis section for synthesizing the first decoded data from the first decoding section and the selectively output data from the selector to obtain a decoded image signal is provided.

Furthermore, in other embodiment of the present invention, an image data decoding method for decoding synthesized-compressed data in which image data with a plurality of resolutions is compressed in block units by different compression systems, respectively, and each compressed data is synthesized to a single piece of compressed data, comprising: separating the synthesized-compressed data into compressed data with each resolution by a separating section; decoding compressed data with a first resolution obtained from the separating section to obtain first high-resolution data and also decoding compressed data with a second resolution obtained from the separating section to output first low-resolution data by a decoding section; converting the first low-resolution data into second high-resolution data by a conversion section; and synthesizing the first and the second high-resolution data to obtain a decoded image signal by an image synthesis section is provided.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a circuit diagram showing a configuration example of a compression section shown in FIG. 2;

FIG. 5A is an explanation view explaining an operation of a first compression section of the compression section shown in FIG. 2;

FIG. 5B is an explanation view explaining an operation of a first compression section of the compression section shown in FIG. 2;

FIG. 6 is an explanation view explaining an operation of a code synthesis section of the compression section shown in FIG. 2;

FIG. 8 is a circuit diagram showing a configuration example of a decoding section of the apparatus shown in FIG. 1;

FIG. 9 is a circuit diagram showing a configuration example of an image synthesis section of the decoding section shown in FIG. 8;

DETAILED DESCRIPTION OF THE INVENTION

Hereinafter, embodiments of the present invention will be explained with reference to the drawings.

Figure 1:
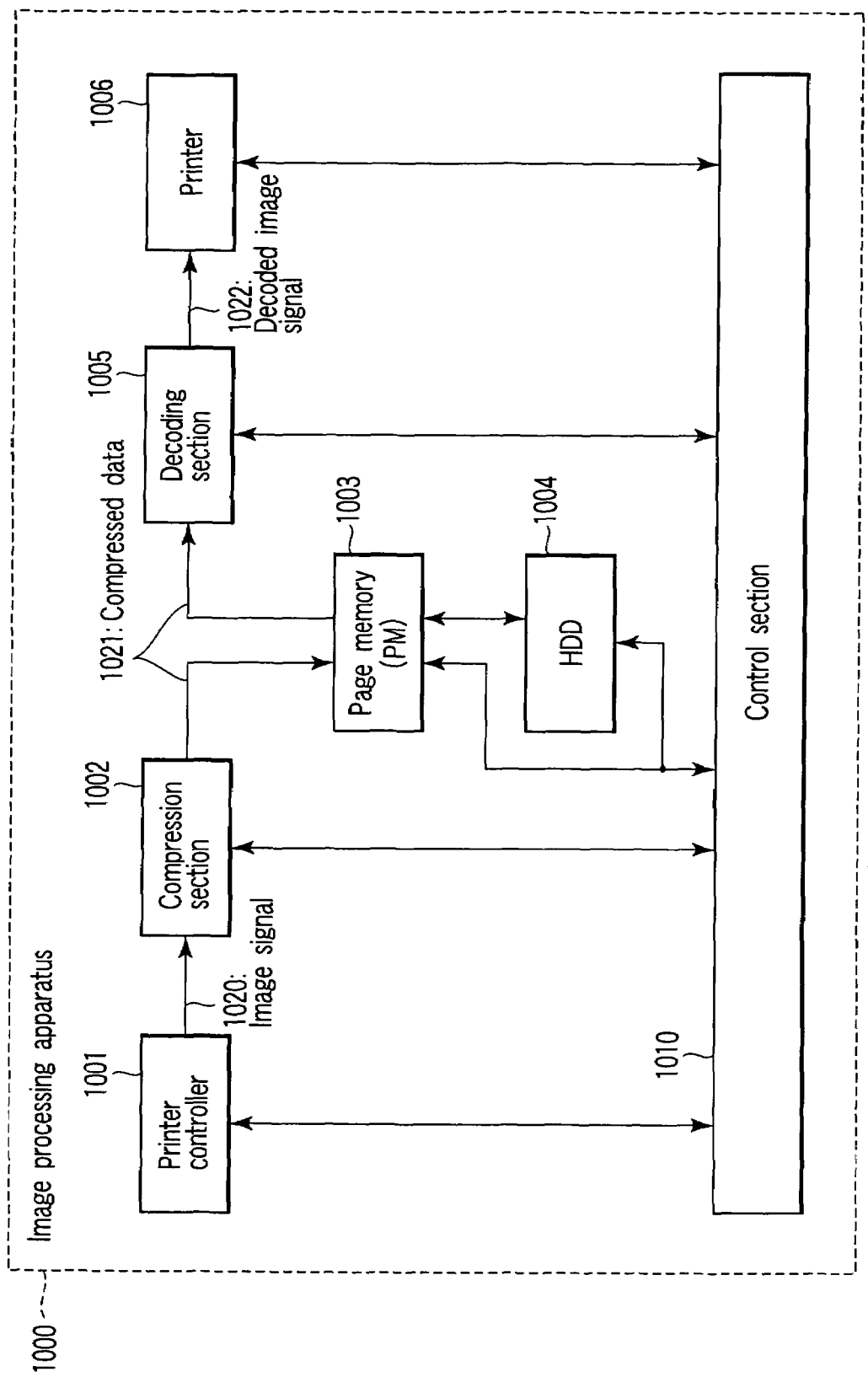
FIG. 1 is a block diagram showing a configuration example of an image processing apparatus regarding an embodiment of the present invention.

FIG. 1 shows a function of an image processing apparatus 1000 regarding a first embodiment of the present invention by dividing the function into blocks.

A printer controller 1001 generates an image signal 1020 to be printed. A compression section 1002 compresses the generated image signal 1020 into compressed data 1021 to output it to a page memory 1003 and an HDD 1004. The page memory 1003 and the HDD 1004 for storing data can store the supplied compressed data 1021. A decoding section 1005 decodes the compressed data 1021 from the memory 1003 or the HDD 1004 to obtain a decoded image signal 1022 and outputs it to a printer 1006. The printer 1006 prints to output the supplied decoded image signal 1022.

Here, the image processing apparatus is integrated and controlled in a variety of the above-described operations by a control section 1010.

FIG. 2 shows the function of the compressing section in FIG. 1 by dividing it into blocks. The same sections as those shown in FIG. 1 are denoted by the same reference marks as those of FIG. 1.

The image signal 1020 supplied to the compression section 1002 is supplied to a block dividing section 1002-1 and divided into 16×16 pixels as block image data 1002-10 to be input to a high-resolution data extracting section 1002-2 and a low-resolution conversion section 1002-4. The extracting section 1002-2 converts the block image data 1002-10 supplied thereto into high-resolution data 1002-11 to supply it to a first compression section 1002-3. The low-resolution conversion section 1002-4 converts the block image data 1002-10 supplied thereto into low-resolution data 1002-14 to supply it to a second compression section 1002-5.

The first compression section 1002-3 compresses the supplied high-resolution data 1002-11 to generate a first compressed code 1002-12 and code length information 1002-13. The first compressed code 1002-12 is supplied to a code synthesis section 1002-6 and the code length information 1002-13 is supplied to the second compression section 1002-5, respectively.

The second compression section 1002-5 generates a second compressed code 1002-15 on the basis of the supplied low-resolution data 1002-14 and the code length information 1002-13. This second compressed code 1002-15 is supplied to the code synthesis section 1002-6. The code synthesis section 1002-6 synthesizes the supplied two compressed codes to output it as compressed data 1021.

Figure 3:
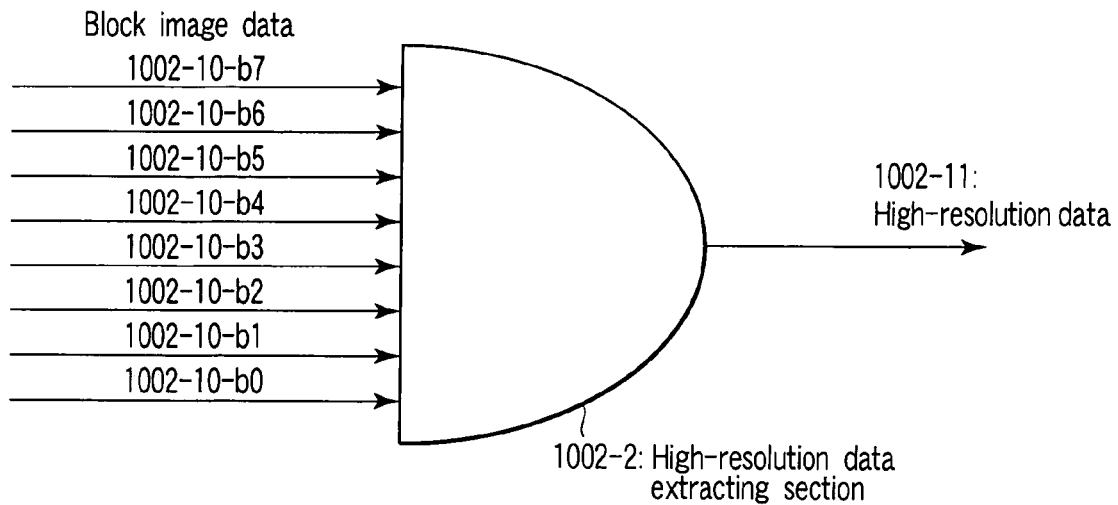
FIG. 3 is a circuit diagram showing a configuration example of a high-resolution data extraction section of the compression section shown in FIG. 2.

FIG. 3 shows a circuit configuration example of the high-resolution data extracting section 1002-2 shown in FIG. 2. Block image data 1002-10-$b0$ to 1002-10-$b7$ supplied to the high-resolution data extracting section 1002-2 are output as the high-resolution data 1002-11 through an AND circuit. That is, an AND operation of all bits of input data is carried out and the result is output. The high-resolution data 1002-11 of which the output is 1, in the case that all of the input data are 1 (=255), and the outputs are 0, in the other cases is output.

Figure 4:
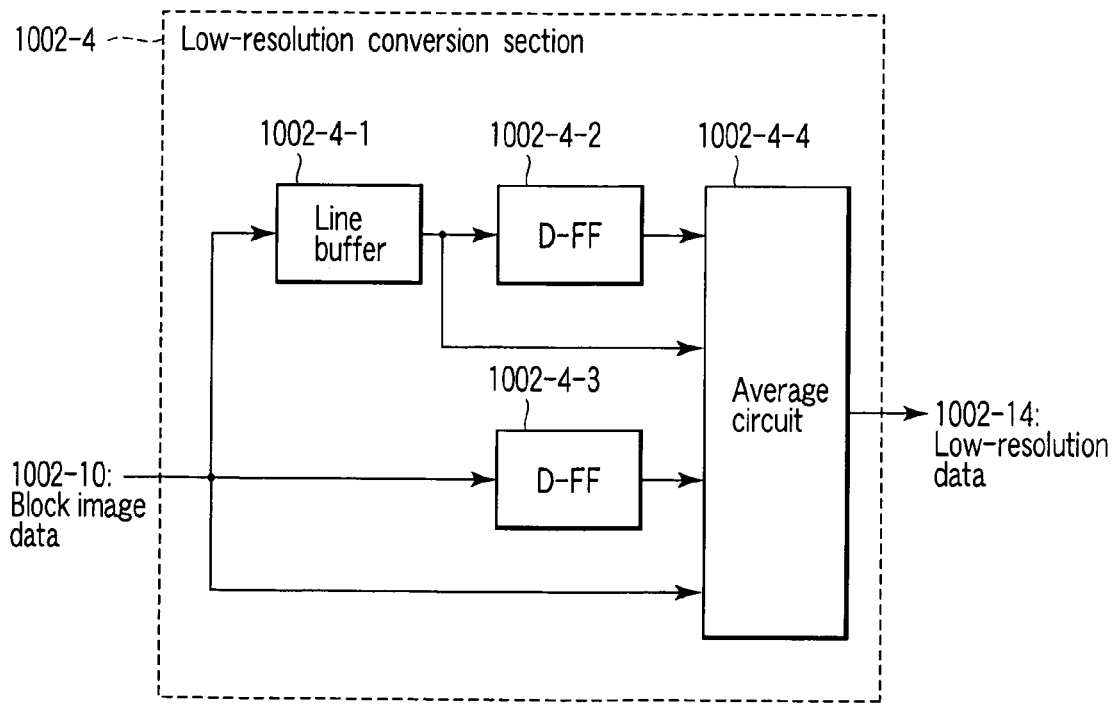
FIG. 4 is a circuit diagram showing a configuration example of a low-resolution conversion section of the compression section shown in FIG. 2.

FIG. 4 shows the circuit configuration of the low-resolution conversion section 1002-4. A line buffer 1002-4-1 delays the data of the supplied block image data 1002-10 by one pixel to output it. A data flip flop (D-FF) 1002-4-2 delays the data output from the line buffer 1102-4-1 by one pixel to output it. Like this, a D-FF 1002-4-3 also delays the block image data 1002-10 by one pixel to output it. An average circuit 1002-4-4 receives block image data 1002-10 with no delay, block image data 1002-10 with one pixel delay, block image data 1002-10 with one horizontal line delay and block image data 1002-10 with one horizontal line delay and one pixel delay. That is, the average circuit 1002-4-4 receives data with one pixel and 4-pixel (2×2 pixels) data around the one pixel.

The average circuit 1002-4-4 averages the simultaneously received data of 2×2 pixels to output it as the low-resolution data 1002-14.

FIG. 5A is an explanation view explaining an operation of the first compression section 1002-3 in FIG. 2. The first compression section 1002-3 is a run-length encoder, scans the supplied high-resolution data 1002-11 in order shown in FIG. 5A to bring it into run-length compression.

FIG. 5B is a view showing an example of a data format of data subjected to ran-length compression. The data format is composed of a code length information area, a start signal area, a run-length code area and a byte adjusting area.

The first compressed code 1002-12 conducts compression processing by unit of 16×16 pixel blocks. The code length information 1002-13 of the run-length indicates the code length of the whole of the first compressed code 1002-12. Here, for example, 4-byte of the first compressed code 1002-12 is described. Next, a signal (1 or 0) of an A position in FIG. 5A is described in the start signal area. Then, the run-length code is described in the run-length code area and an adjusting bit to adjust the whole code by byte is inserted in the byte adjusting area.

On the other hand, the second compression section 1002-5 is an already known modified JPEG encoder and outputs the second compressed code 1002-15 (code length of JPEG code and JPEG code) in which a target code length supplied from the control section 1010 is adjusted by block by using the code length information 1002-13 supplied from the first compression section 1002-3 and the low-resolution data 1002-14.

FIG. 6 is an explanation view explaining the operation of the code synthesis section 1002-6 of the compressed section 1002 shown in FIG. 2. The code synthesis section 1002-6 converts the supplied first compressed code 1002-12 and the second compressed code 1002-15 into a prescribed code quantity (64-byte in this example) to output it as the compressed data 1021. Accordingly, 16-byte×16-byte=256-byte information is compressed into the 64-byte information.

Figure 7:
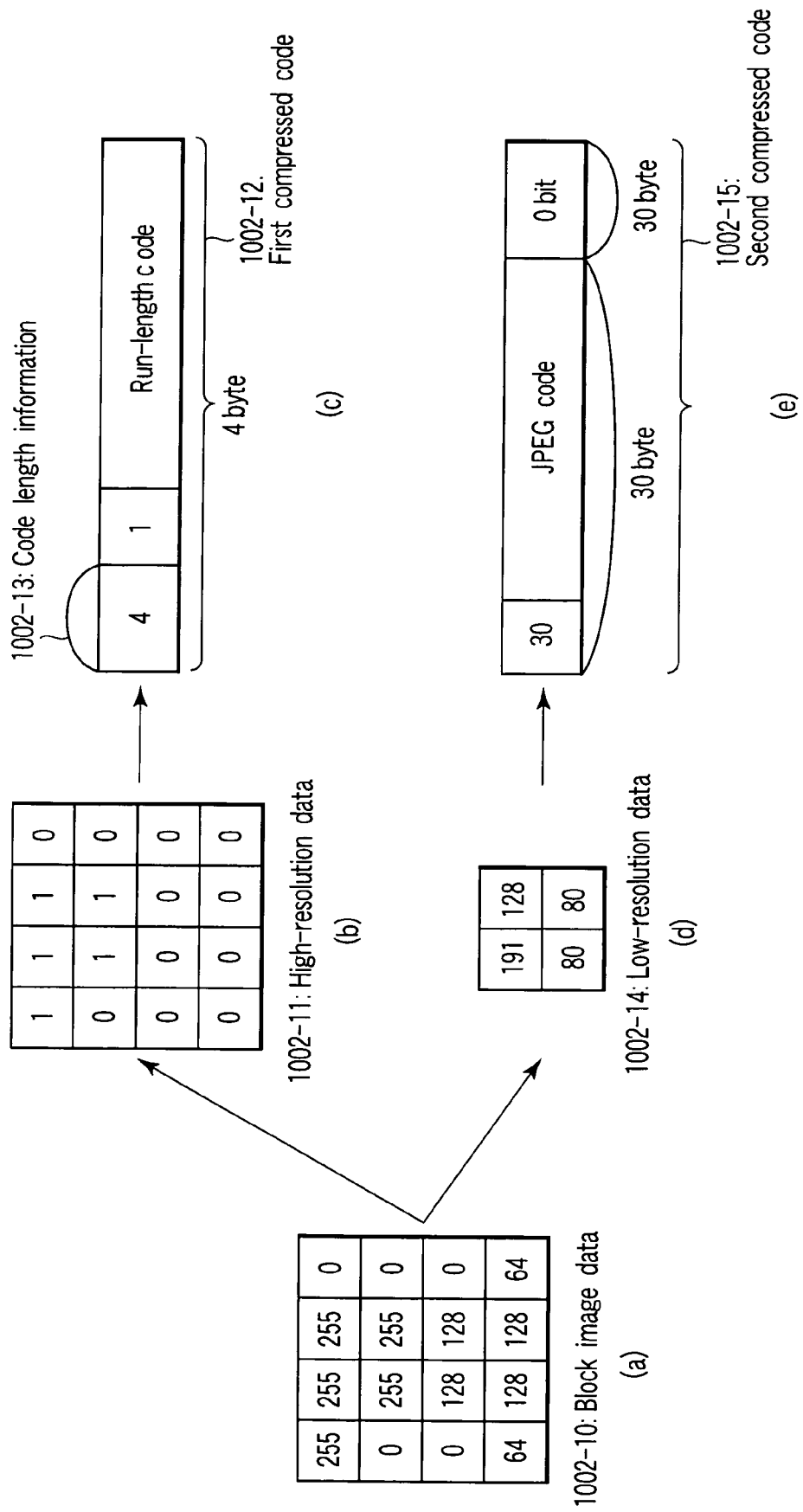
FIG. 7 is an explanation view explaining a generation example of compressed data generated from the compression section shown in FIG. 2.

FIG. 7 shows a generation example of the compressed data 1021 generated from the compression section 1002 shown in FIG. 2. However, although the example will be described in 4×4 size for the purpose of simplification, operations are not different with each other. The input data has 16×16=256 bytes, so that compression rates for each block are compressed to ¼.

The (a) of FIG. 7 shows the block image data 1002-10. The block image data 1002-10 is supplied to the high-resolution data extracting section 1002-2 to be converted into the high-resolution data 1002-11 as shown in (b) of FIG. 7. The high-resolution data 1002-11 is supplied to the first compression section 1002-3 to be compressed into the first compressed code 1002-12 shown in (c) of FIG. 7 and output. The block image data 1002-10 is supplied to the low-resolution conversion section 1002-4 to be converted into the low-resolution data 1002-14 as shown in (d) of FIG. 7. The low-resolution data 1002-14 is supplied to the second compression section 1002-5 and compressed into the second compressed code 1002-15 to be output as shown in (e) of FIG. 7. However, if a JPEG code quantity and a run-length code quantity are lower than prescribed quantities, the 0 bit for size adjustment is inserted by the quantity of 30 bytes.

FIG. 8 shows a function composing the decoding section 1005 of the apparatus in FIG. 1 by dividing the function into blocks. The sections shown in FIG. 1 are put the same reference marks as those of FIG. 1.

The compressed data 1021 supplied to the decoding section 1005 is supplied to a code separating section 1005-1 in the decoding section 1005. The code separating section 1005-1 separates the compressed data 1021 into a run-length code 1005-10 and a JPEG code 1005-11. The run-length code 1005-10 is supplied to a first data decoding section 1005-2 and decoded to a first decoded data 1005-12 to be output to an image synthesis section 1005-5. The JPEG code 1005-11 is supplied to a second data decoding section 1005-3 and decoded to a second decoded data 1005-13 to be output to a resolution conversion section 1005-4.

The second decoded data 1005-13 supplied to the resolution conversion section 1005-4 is resolution-converted and output to the image synthesis section 1005-5 as the resolution-converted data 1005-14. The image synthesis section 1005-5 synthesizes the supplied first decoded data 1005-12 and the resolution-converted data 1005-14 to output the decoded image signal 1022.

The first data decoding section 1005-2 composing the decoding section 1005 is a known run-length decoder, the second data decoder 1005-3 is a known JPEG decoder, and the resolution conversion section 1005-4 is an expander to simply expand a pixel twice, so that, the image synthesis section 1005-5 composing a principal section of the present invention will be described by referring to FIG. 9.

FIG. 9 is a view showing the circuit configuration of the image synthesis section 1005-5 of the decoding section 1005 shown in FIG. 8. The image synthesis section 1005-5 operates by a unit having reduced resolution as one processing unit. That is to say, the resolution-converted data (low-resolution data) 1005-14 is supplied to an adder 1005-5-1 to be added in 2×2-pixel units and the addition result a 1005-5-11 is output to a difference unit 1005-5-5.

The first decoded data (high-resolution data) 1005-12 is supplied to a multiplier 1005-5-2 to be multiplied by 255. That is, the input "0" is output as "0" and the input "1" is output as "255". This multiplication result 1005-5-12 is added in 2×2-pixel units by the adder 1005-5-4 and the addition result b 1005-5-13 is output to the difference unit 1005-5-5.

The difference unit 1005-5-5 subtracts the addition result b 1005-5-13 from the addition result a 1005-5-11 to output a differential value 1005-5-14. Here, the image synthesis section 1005-5 can obtain a signal value other than the pixel value lossless-compressed with a high resolution. Then, the signal value is clipped to "0" when the differential value becomes a minus value.

On the other hand, a counter 1005-5-3 counts the pixel of "0" of the high-resolution data 1005-12 at every 2×2-pixel area (at every processing) to output a counter output 1005-5-15. That is, the counter 1005-5-3 counts the number of the pixels of "0" in the 2×2-pixel area. A divider 1005-5-6 divides the output differential value 1005-5-14 by the counter output 1005-5-15. A division result 1005-5-16 is a pixel value of a non-high-resolution pixel.

If a high-resolution pixel value is "0", a selector (sel) 1005-5-7 selects to output the division result 1005-5-16, and if the high-resolution pixel value is "1", the selector (sel) 1005-5-7 selects the multiplication result 1005-5-12 (namely, "255") to output it. The output from the selector 1005-5-7 is output as a composite image signal synthesized with a high-resolution.

Figure 10:
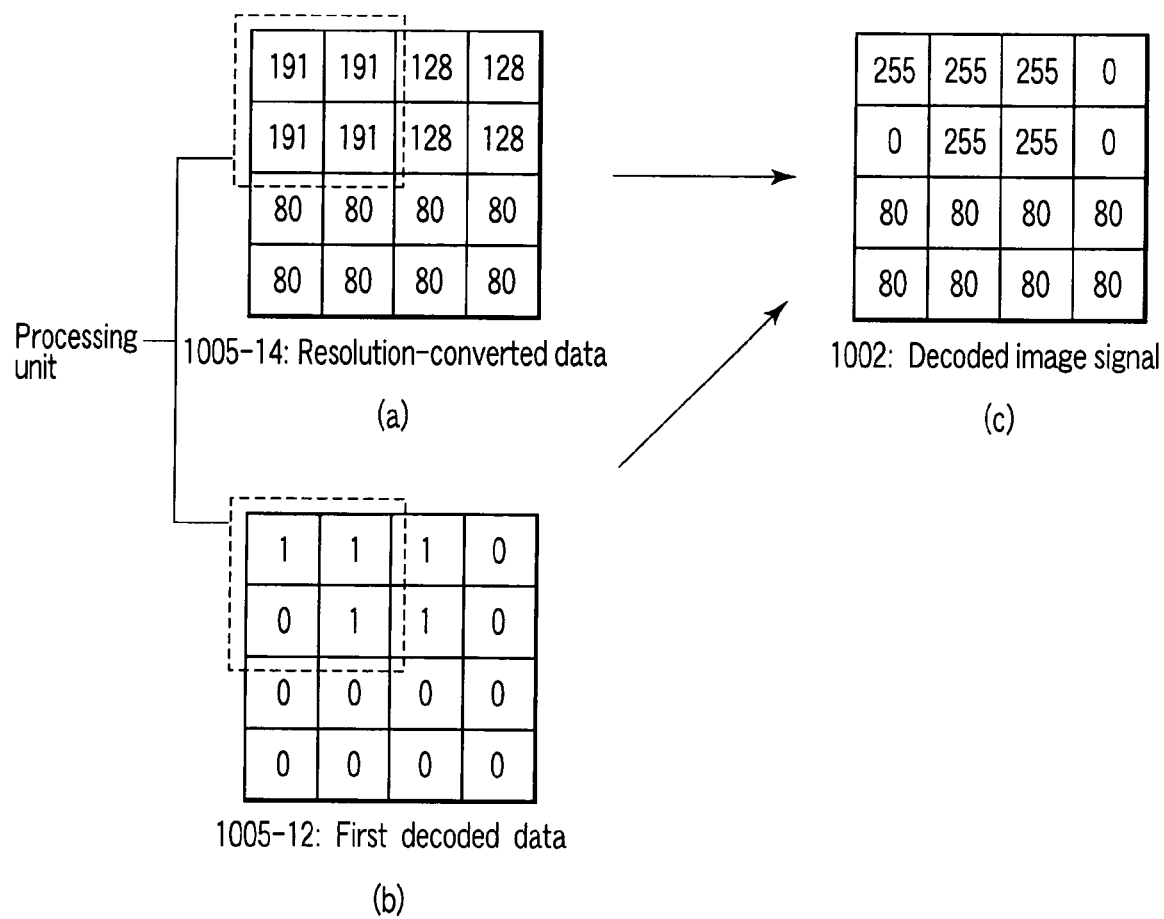
FIG. 10 is an explanation view explaining an operation of the image synthesis section shown in FIG. 9.

FIG. 10 shows examples of the resolution-converted data 1005-14, the first decoded data 1005-2 and the decoded image signal 1002 shown to explain operation examples of the image synthesis section 1005-5 shown in FIG. 9. However, for the simplification of the explanation, it is assumed that an image part to be explained is not degraded in image quality through the JPEG. The low-resolution compressed data 1002-14 shown in (d) in FIG. 7 is decoded into the low-resolution data 1005-14 in (a) of FIG. 10. The (b) of FIG. 10 shows the high-resolution data 1005-12. The low-resolution data 1005-14 and the high-resolution data 1005-12 are synthesized into the decoded image signal 1022 shown in (c) of FIG. 10 by the operation described in FIG. 9.

In the (a) of FIG. 10, we focus attention on a processing unit surrounded by a dotted line. The adder 1005-5-1 quadruples "191" to output "746" as the addition result a 1005-5-11. On the other hand, at the processing unit for the corresponding high-resolution data 1005-12, one piece of "0" and three pieces of "1" are included. The multiplier 10050502 and the adder 1005-504 produce 255×3=765, respectively. In this case, since the difference is "−1" and a minus number, it is clipped to "0" to be output. On the other hand, the counter 1005-5-3 counts the pixel of "0" then "1" is output. Therefore, the multiplier 1005-5-6 performs (1/0) processing then outputs "0". On the other hand, in the 2×2-pixel area being a processing unit, when the high-resolution data is "0", the selector 1005-5-7 selects the output from the divider 1005-596, and when the high-resolution data is "1", the selector 1005-5-7 selects the output from the multiplier 1005-5-2. Accordingly, within the area of the processing unit of the 2×2-pixel, data of "255", "255", and "255" is output from the image signal 10022. In the areas of other processing units, the same calculations as those of the above-mentioned processing units are performed.

The high-resolution image with 1,200 dpi, etc., has a point to hold the high-resolution information by holding those values [black (255) and white (0)] at sites with the largest pixel value difference such as that between the values of black (255) and white (0). Accordingly, as described above, by maintaining the black pixel (255) by the lossless-conversion, the merit in image quality of the high-resolution data can be sufficiently obtained.

The above-described technique can obtain a higher compression rate than that obtained in plain compression of the image with 1,200 dpi and simply treat the compressed data by using a compression format in which a fixed data length is kept in block units.

Having described the example in which only the image signal is compressed in the above example, the image synthesis section can decode even the compressed data including the information on an attribute of bitmap of known tag information and the like, in a similar way. For example, in the case of the compressed data in which the tag information is compressed with a higher resolution and the image information is compressed with a lower resolution, the image synthesis section can decode the image information with the lower resolution into image information with a higher quality.

In the storing of the compressed data onto the HDD, by re-putting the adjustment code when deleting the 0-bit adjustment code of the low-resolution code in (e) in FIG. 7 and restoring it to the page memory (PM), the HDD storage capacity is reduced, so that the number of storage pieces is increased. The image synthesis section can be configured to decode the compressed data without re-putting the 0-bit adjustment code when re-storing the compressed data onto the PM. That is to say, the synthesized-compressed data may be switched to a fixed data length type with the code length adjustment data added thereto or a variable data length type with the adjustment data for the code data length deleted therefrom, in response to storage destinations.

Furthermore, in the above example, having treated the 255-value of a monochrome signal as the high-resolution lossless data, the image synthesis section may simply output the high-resolution data of the CMYK, for example, so long as only the K signal of the CMYK signal is compressed with a high resolution but the CMY signal is the data compressed with a low resolution. The present invention is not limited to the form of the above-mentioned embodiment. In the example, although the compression section decides the code quantity of the low-resolution data on the basis of the compressed size and the target code quantity, the compression section decides maximum transfer rates of both high-resolution compressed data and the low-resolution compressed data in the case that the compressed data of a CMY (low resolution) K (high resolution) signal is output from the four-rotation engine printer, by deciding the target values in the necessity of data with high and low resolutions, respectively, and co-existing the lossy and lossless compressions if necessary.

Figure 11:
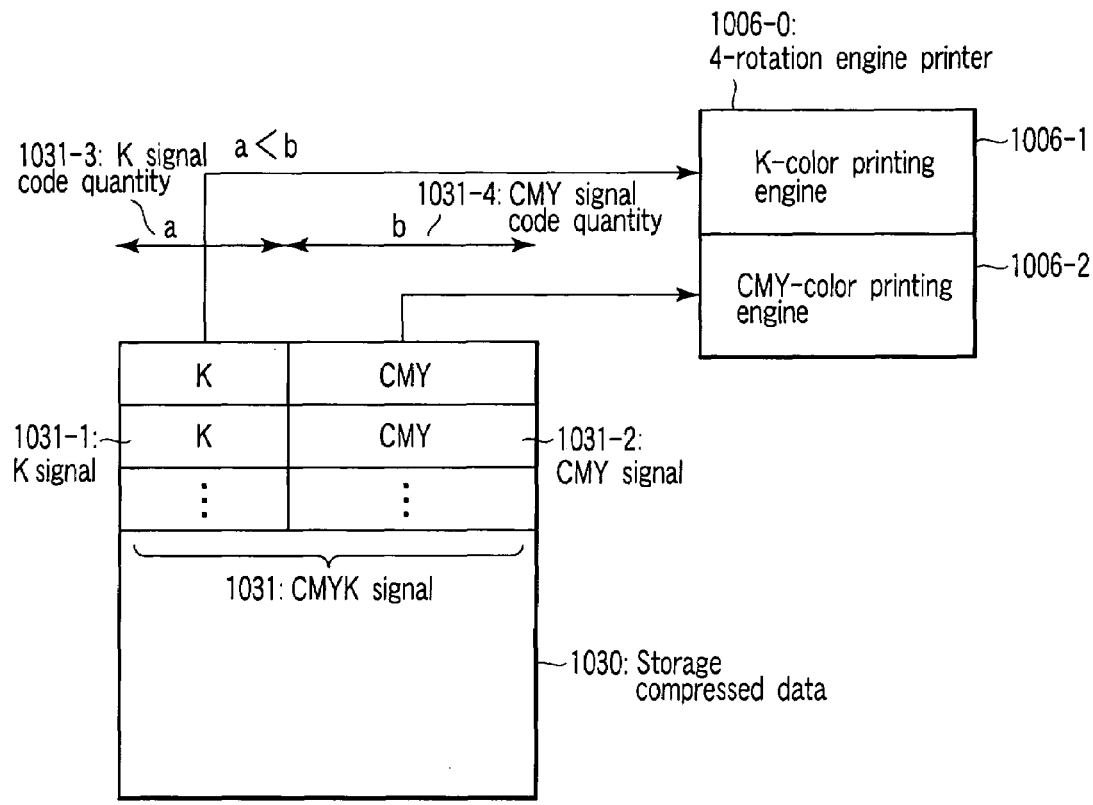
FIG. 11 is an explanation view explaining processing of a CMYK signal in printing by four-rotation engine printer.

FIG. 11 is an explanation view for explaining the processing of the CMYK signal, for example, when outputting the decoded image data to a four-rotation engine printer 1006-0. The reference number 1006-0 denotes the four-rotation engine printer 1006-0 composed of a K color printing engine 1006-1 capable of printing only in k color and a CMY color printing engine 1006-2 capable of printing in CMY color. The reference number 1030 denotes a CMYK signal 1030 stored in the PM 1003 or the HDD 1004.

The CMYK signal is composed of a K signal 1031-1 and a CMY signal 1031-2. Here, for example, a K signal code quantity 1031-3 of the K signal 1031-1 is referred to as "a" and a CMY signal code quantity 1031-4 of the CMY signal is referred to as "b". In the case of a<b, namely, the CMY signal code quantity 1031-4 is larger than the K signal code quantity 1031-3, the image processing apparatus regarding this embodiment is a system capable of transferring the image data by "a" or "b". The system like this can transfer only the necessary data in each case when the K signal 1031-1 and the CMY signal 1031-2 are required, respectively. Therefore, the maximum transfer rate of the system becomes smaller than that of transferring of the CMYK signal 1031 all together, so that the system can reduce costs.

Here, the system can be adapted to an engine in use and optimized by individually setting target values for each of a C signal, M signal, Y signal and K signal so as to make them be each code form allowing to be accessed individually.

As mentioned above, this embodiment can easily decode a code in which compressed data different in resolution is synthesized into one item of synthesized-compressed data, so that the high-resolution data can be processed easily.

Figure 12:
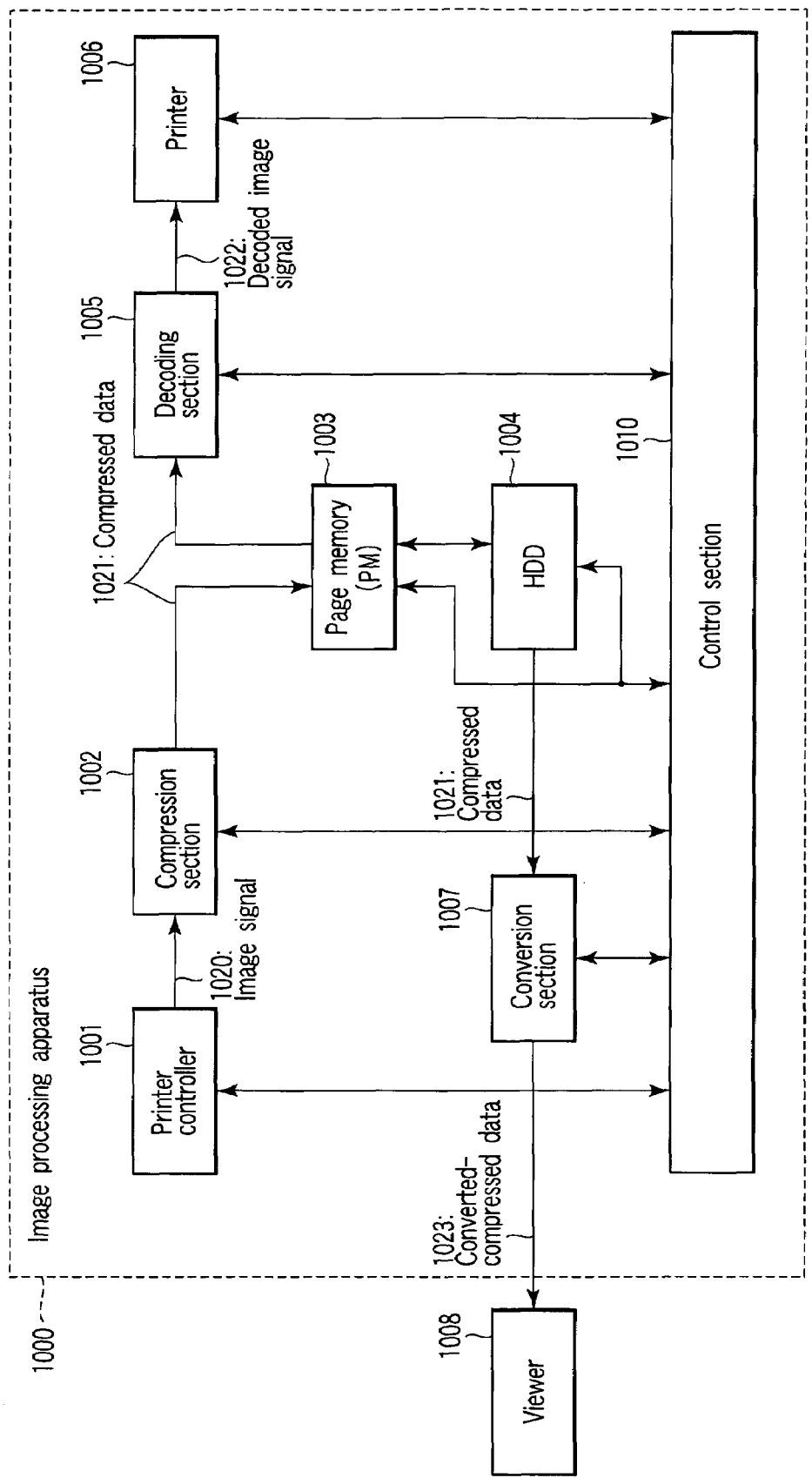
FIG. 12 is other embodiment of the image processing apparatus shown in FIG. 1.

FIG. 12 shows other embodiment of the image processing apparatus 1000 in FIG. 1. This embodiment is the same as the image processing apparatus 1000 shown in FIG. 1 except that a viewer 1008 is newly added to the output destination of the HDD 1004 and a conversion section 1007 is added for the data transfer therebetween.

The HDD 1004 stores compressed data 1021 of the image signal 1020 compressed by the compression section 1002. The compressed data 1021 stored in the HDD 1004 is supplied to the conversion section 1007. The conversion section 1007 converts the supplied and compressed data 1021 into converted-compressed data 1023 viewable by the viewer 1008 to supply it thereto. The viewer 1008 can display the supplied converted-compressed data 1023.

Figure 13:
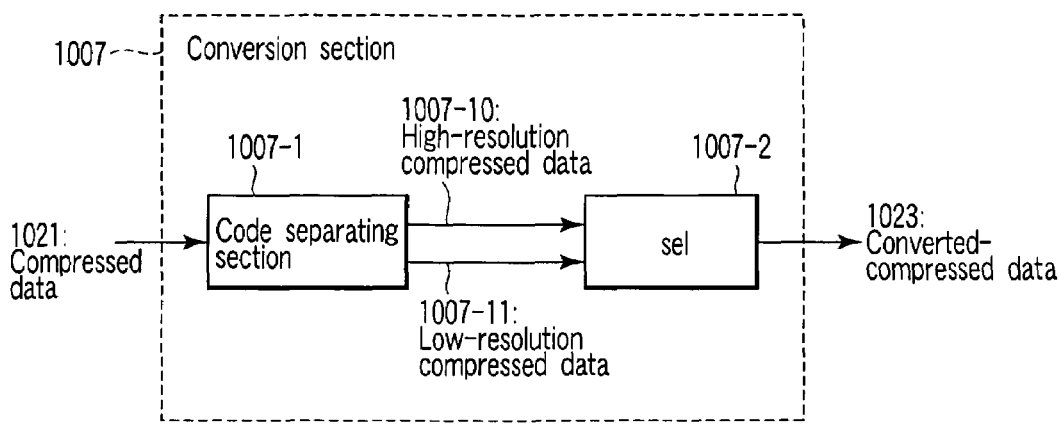
FIG. 13 is a circuit diagram showing a configuration example of a conversion section of the apparatus shown in FIG. 12.

FIG. 13 is the circuit diagram showing the configuration of the conversion section 7 of the image processing section 1000 in FIG. 12.

The compressed data 1021 supplied to the conversion section 1007 is supplied to a code separating section 1021 and separated into high-resolution compressed data 1007-10 and low-resolution compressed data 1007-11 to be output. The selector (sel) 1007-2 selects the supplied high and low-resolution data 1007-10, 1007-11 by the control from the control section 1010 and supplies the converted-compressed data 1023 to the viewer 1008. For example, in that case that the compressed data 1021 is compressed data shown in this embodiment, if a user wants to mainly browse textual information, the high-resolution compressed data 1007-10 is selected and if the user wants to acquire a whole image including a photograph, the low-resolution compressed data 1007-11 is selected to be output, respectively. It is easy for the conversion section 1007 to extract only the code of an arbitrary position because the compressed data has been encoded block units.

Furthermore, the storage of the compressed data 1021 in the form of the fixed length data makes the necessary information allow being extracted and decoded though a simple address calculation. Even when the compressed data is converted into variable length data and stored in the HDD 1004, the compressed data is encoded by combining code length information of each block, so that the conversion section 1007 can extract to decode the code at the arbitrary block position by utilizing only the code length information. Thereby, the image processing apparatus 1000 easily browses the compressed data in two dimensions such as resolution and position information.

Figure 14:
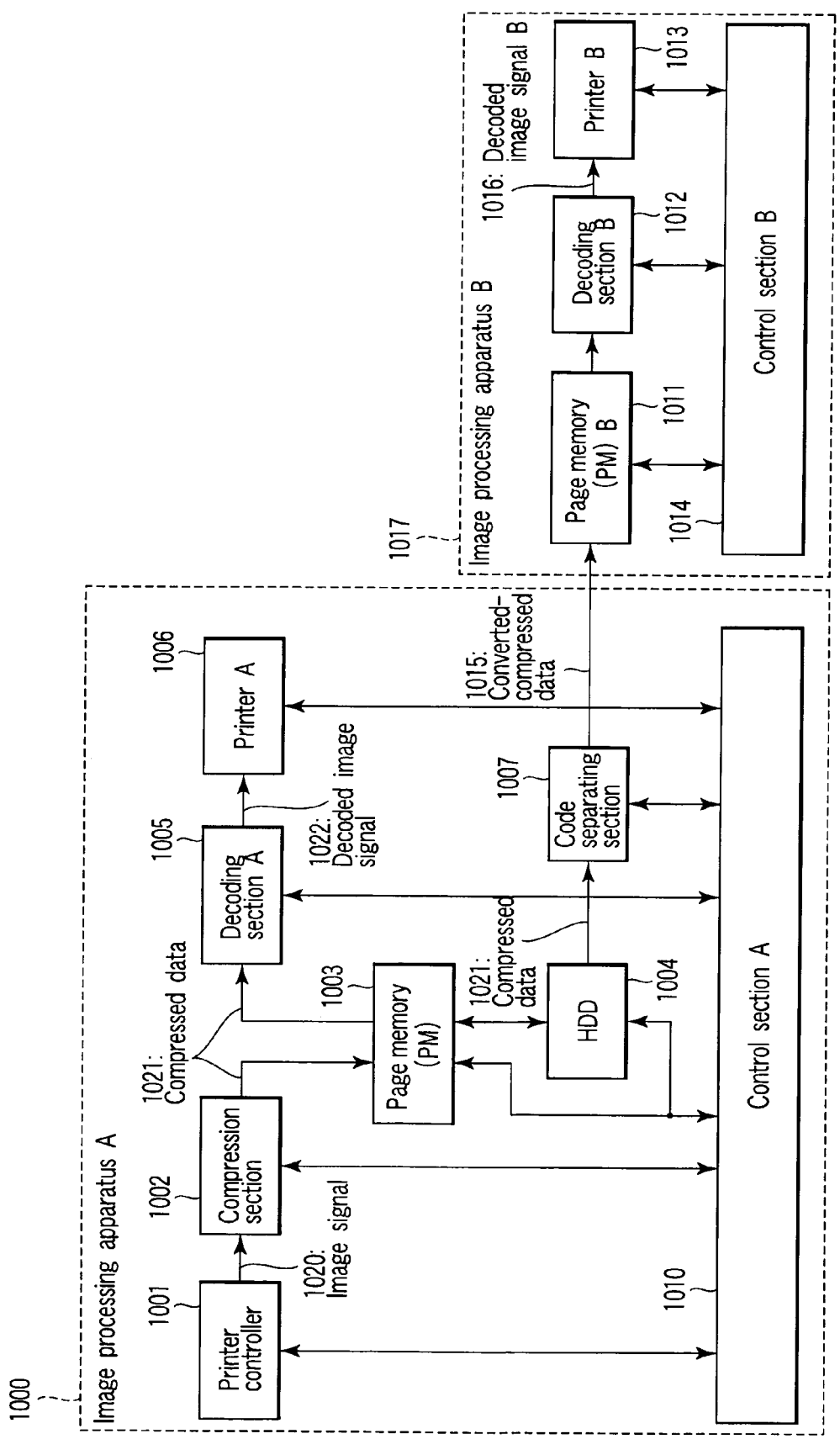
FIG. 14 is further other embodiment of the apparatus shown in FIG. 1.

FIG. 14 further shows other embodiment of the image processing apparatus 1000. An image processing apparatus B 1017 including a printer B 1013 is newly added to an output destination of the HDD 1004 and the conversion section 1007 is added for data transfer therebetween.

The compressed data 1021 of the image signal 1020 compressed by the compression section 1002 is stored in the HDD 1004. The compressed data 1021 stored in the HDD 1004 is supplied to the conversion section 1007. The printer B 1013 being a section to finally output data is assumed to be, for example, a 600 dpi printer. Then, the conversion section 1007 is applied control to convert the resolution of the compressed data 1021 into 600 dpi from a control section A 1010 to store converted-compressed data 1015 in which only the low-resolution data 1002-14 is extracted to a PM B 1011. A decoding section B 1012 receives the converted-compressed data 1015 from the PM B 1011 and decodes it into a decoded image signal B 1016 to supply it to the printer B 1013. The printer B 1013 prints the supplied image signal B 1016 to output it. Here, the image processing apparatus B 1017 is controlled in the whole variety of above-mentioned operations by the control section 1014. And it is enough for the coding section B 1012 to be able to decode only the low-resolution data 1002-14, so that the coding section B 1012 is sufficient to be structured by the second data coding section 1005-13 in FIG. 8.

The present invention is not limited to the above-described embodiment. Having described that the compressed data 1021 is converted into 600 dpi in accordance with the resolution printable by the printer B 1013, the image processing apparatus B 1017 may be configured in accordance with other resolutions.

Figure 16:
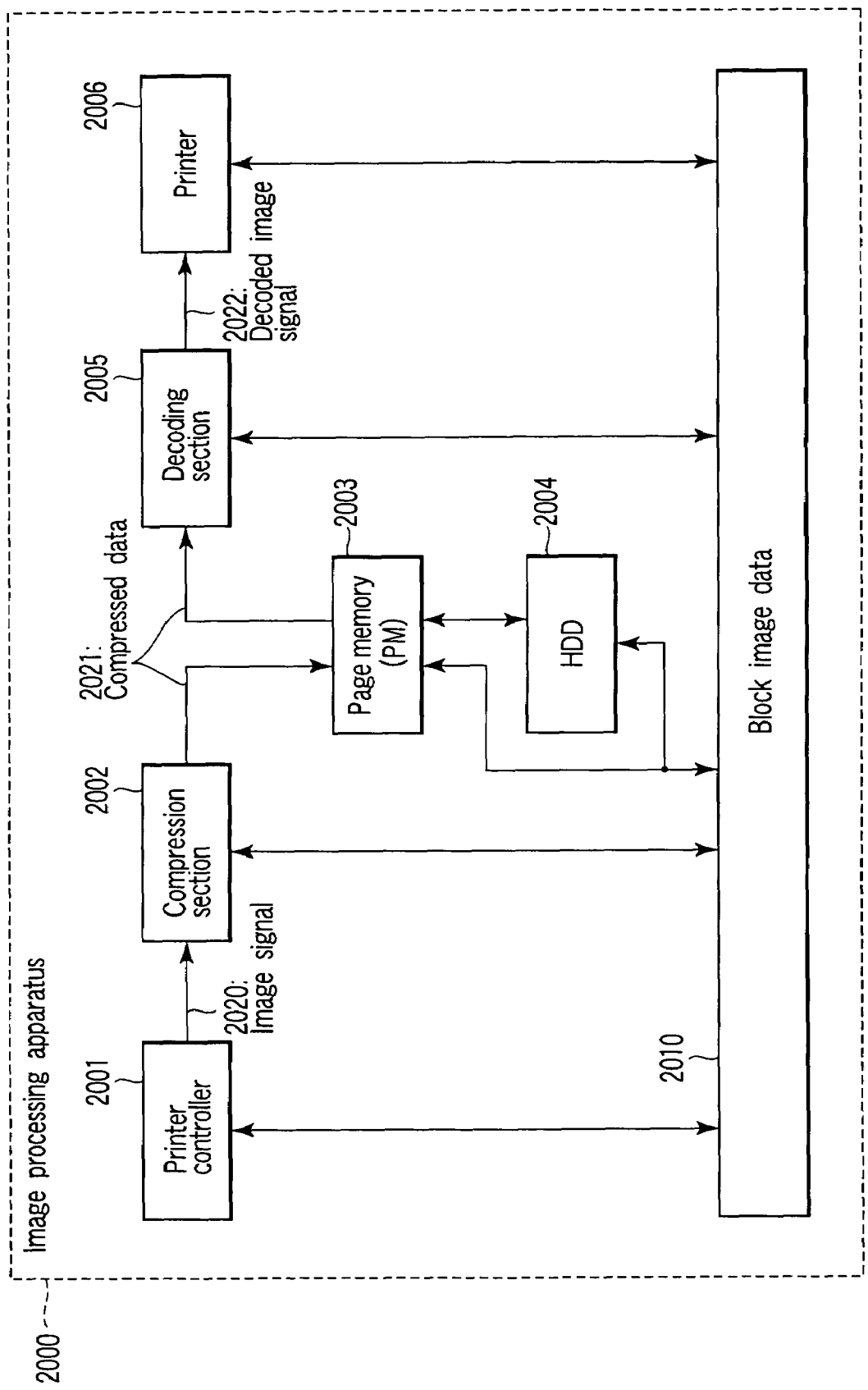
FIG. 16 is further other embodiment of the image processing apparatus shown in FIG. 1.

Although only the low-resolution data 1002-14 is decoded in decoding the data, the image processing apparatus may be configured so as to generate a pulse reference position signal 1002-16, based on the high-resolution data 1002-11 and obtain the decoded image signal B 1016 from the low-resolution data 1002-14 and the pulse reference position signal 1002-16, as shown in FIG. 16.

Figure 15:
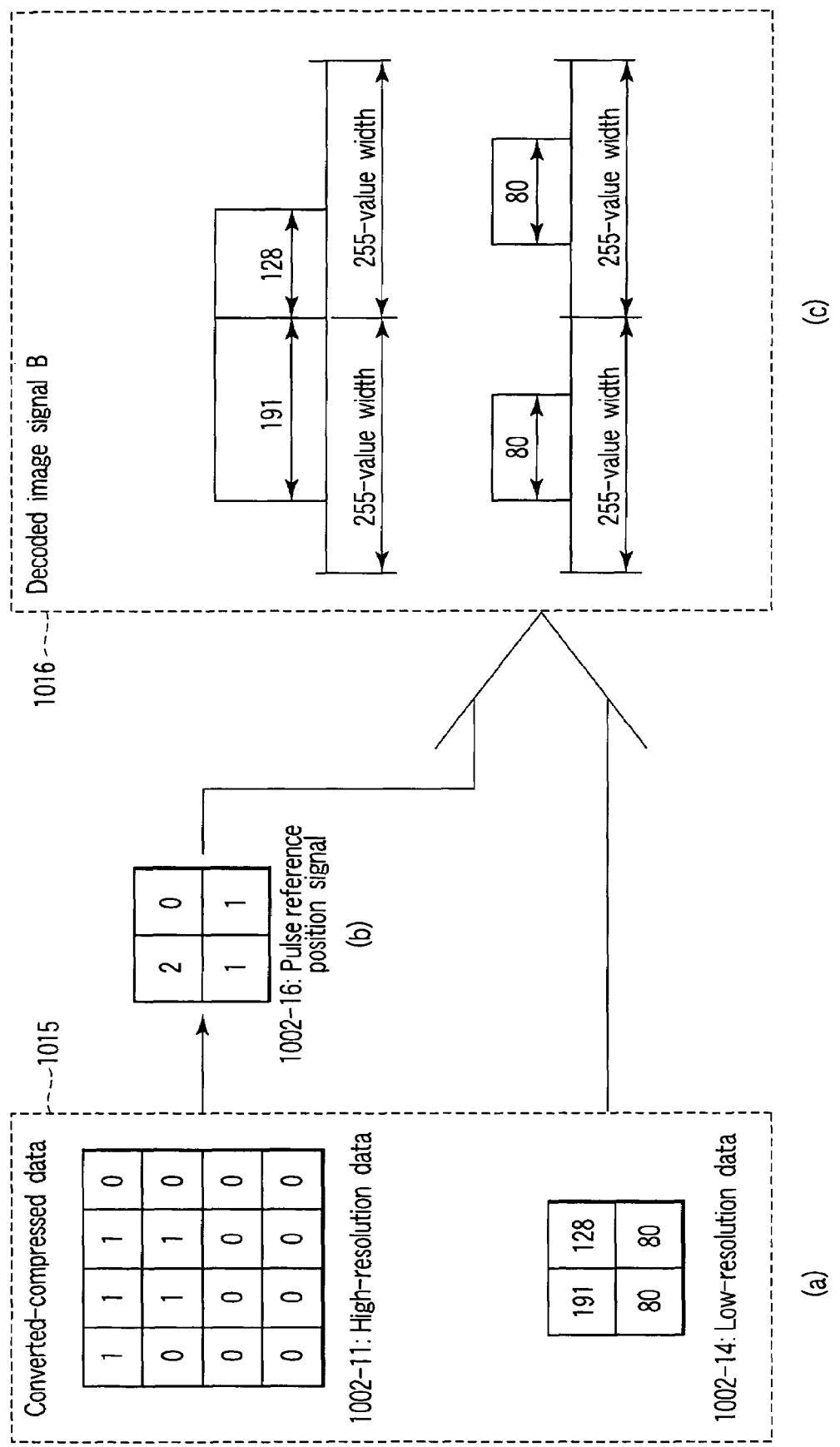
FIG. 15 is an explanation view explaining an operation of a decoding section regarding other embodiment regarding an image processing apparatus A and an image processing apparatus B shown in FIG. 14.

FIG. 15 is an explanation view for explaining an operation of the decoding section B 1012 in other embodiment of the image processing apparatuses A 1000 and B 1017 shown in FIG. 14.

The conversion section 1007 supplies the converted-compressed data 1015 in which the high-resolution data 1002-11 and the low-resolution data 1002-14 of the supplied compressed data 1021 is extracted to the decoding section B 1012 though the PM B 1011.

As shown in (a) of FIG. 15, the converted-compressed data 1015 is composed of the block image data of the high-resolution data 1002-11 and the low-resolution data 1002-14. The decoding section B 1012 generates, as shown in (b) of FIG. 15, the pulse reference position signal 1002-16 from the high-resolution data 1002-11.

In an electronic photograph printer using laser, a lighting time period of a signal decides a printing density. Since printing is performed by area modulation, if the data is not more than 255-value, the photograph printer assumed to perform high-resolution printing. Usually, in the case of printing of texts or the like, the printer varies a pulse start position so as to improve stability and resolution of the printed pixel. In the low-resolution data 1002-14, the pulse start position thereof is decided on the basis of the pulse reference position signal 1002-16, for example, as like a left reference (0), a central reference (1) and a right reference (2), as shown in FIG. 15.

That is, the printer refers the high-resolution data and the pulse reference position signal in FIG. 15. In the 2×2-pixel area of the high-resolution data, a left upper area consists of three "1" and one "0", and three "1" are concentrated on the right side in the area. Therefore, in this case, the right reference (2) is determined as the pulse start position. In the 2×2-pixel area of the high-resolution data, a left lower area consists of four "0". Therefore, in this case, the central reference (1) is determined as the pulse start position. In the 2×2-pixel area of the high-resolution data, a right upper area consists of two "1" and two "0", and two "1" are concentrated on the left side in the area. Accordingly, in this case, the left reference (0) is determined as the pulse start position.

Therefore, the coding section B 1012 can generate accurate reference position signals even with low resolutions, based on the pulse reference position signal 1002-16. Thereby, high-quality printing can be performed by the printer.

FIG. 16 further shows a function composing an image processing apparatus 2000 in other embodiment by dividing the function into blocks.

Since the sections other than a compression section 2002 and a decoding section 2005 are the same as those of the image processing apparatus 1000 shown in FIG. 1, only the compression section 2002 will be described by referring FIG. 17 or later.

Figure 17:
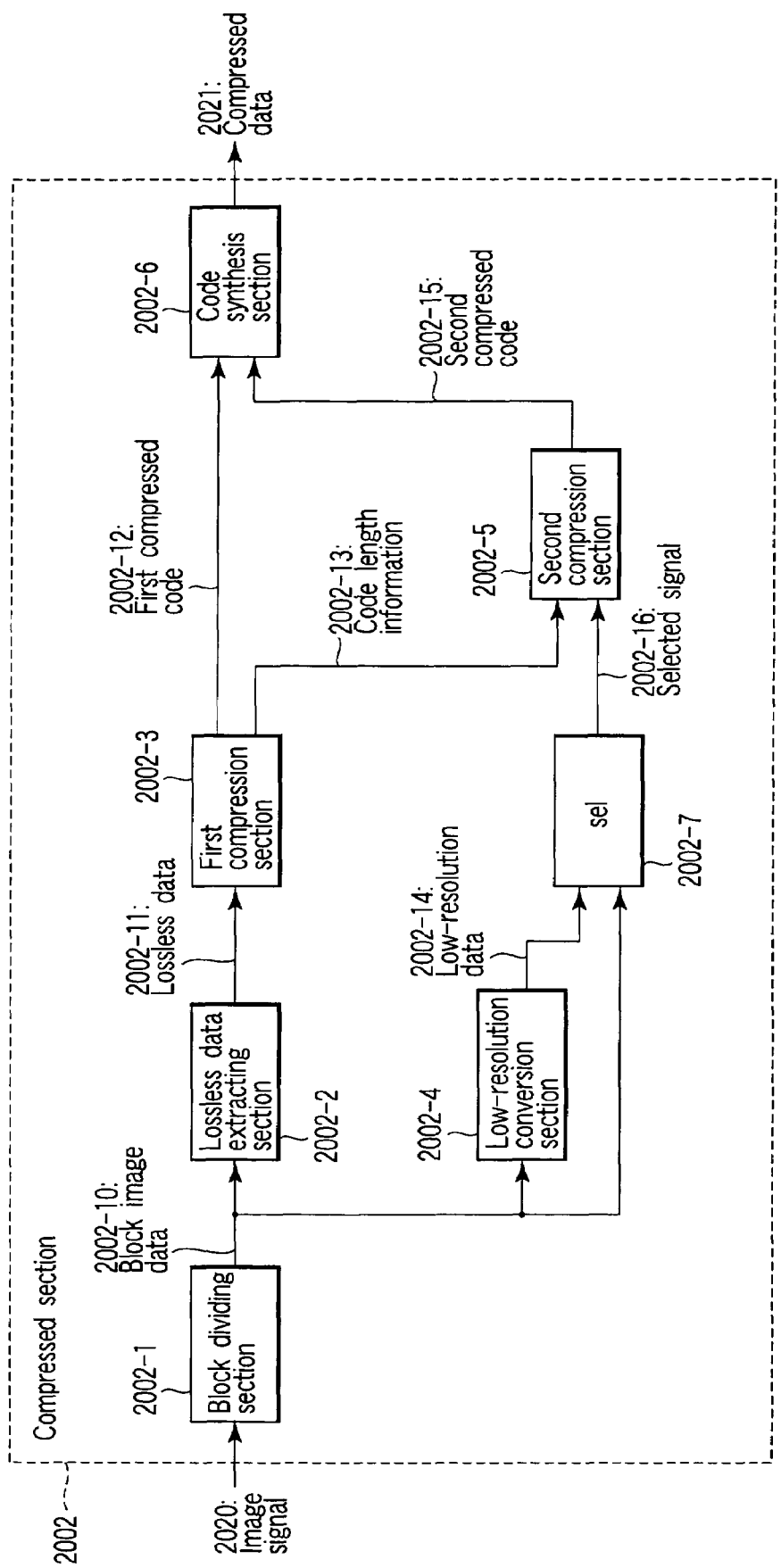
FIG. 17 is a circuit diagram showing a configuration example of a compression section of the image processing apparatus shown in FIG. 16.

FIG. 17 is the circuit diagram showing the configuration of the compression section of the image processing apparatus 2000 shown in FIG. 16. The same parts as those of FIG. 16 are denoted by the same reference marks as those of FIG. 16.

An image signal 2020 with 1,200 dpi which is input from a printer controller 2001 is supplied to a block dividing section 2002-1 to output block image data 2002-10 extracted in 16×16-pixel units.

A lossless data extracting section 2002-2 separates the supplied block image data 2002-10 into 255-pixel value and information other than the 255-pixel value to output lossless data 2002-11. A first compression section 2002-3 compresses the supplied lossless data 2002-11 to supply a first compressed code 2002-12 to a code synthesis section 2002-6 and supplies code length information 2002-13 to a second compression section 2002-5.

A low-resolution conversion section 2002-4 converts the supplied block image data 2002-10 with 1,200 dpi into that with a resolution of 600 dpi to supply low-resolution data 2002-14 to a selector 2002-7.

The selector 2002-7 selects either the block image data 2002-10 with 1,200 dpi or the low-resolution data 2002-14 with 600 dpi to output a selected signal 2002-16.

The second compression section 2005-5 compresses the selected signal 2002-16 on the basis of the supplied code length information 2002-13 to supply a second compressed code 2002-15 to the code synthesis section 2002-6. The code synthesis section 2002-6 synthesizes the supplied first compressed code 2002-12 and the first compressed code 2002-15 to output high-resolution compressed data 2021.

At this moment, although the image signal 2020 supplied from the printer controller 2001 is the image signal 2020 with 1,200 dpi, the image signal 2020 is not limited to this. In the case of supplying of the image signal 2020 with 600 dpi from the printer controller 2001, the block dividing section 2002-1 extracts the image signal 2020 in 8×8-pixel units.

The lossless data extracting section 2002-2 extracts the lossless data 2002-11 by the same processing except for the size. This lossless data 2002-11 is compressed by the first compression section.

In this case, the selector 2002-7 directly selects the block image data 2021 to supply it to second compression section, as the selected signal 2002-16. Then, the code synthesis section 2002-6 synthesizes the first compressed code 2002-12 and the second compressed code 2002-15 to output usual-resolution compressed data 2021.

In the case of the above-mentioned embodiment, the compression section 2002 can treat the selected signal 2002-16 as the compressed data always having a fixed data quantity regardless of its resolution by setting the target code quantity of the second compression section 2005-5 to the same target code quantity in both cases of the image signals 2020 with 1,200 dpi and 600 dpi. Thereby, coded data is simply treated.

The compression section 2002 can perform the compression suitable for 1,200 dpi and 600 dpi without extremely modifying the encoder by decreasing the target code quantity if the target code quantity is set to 600 dpi.

Figure 18:
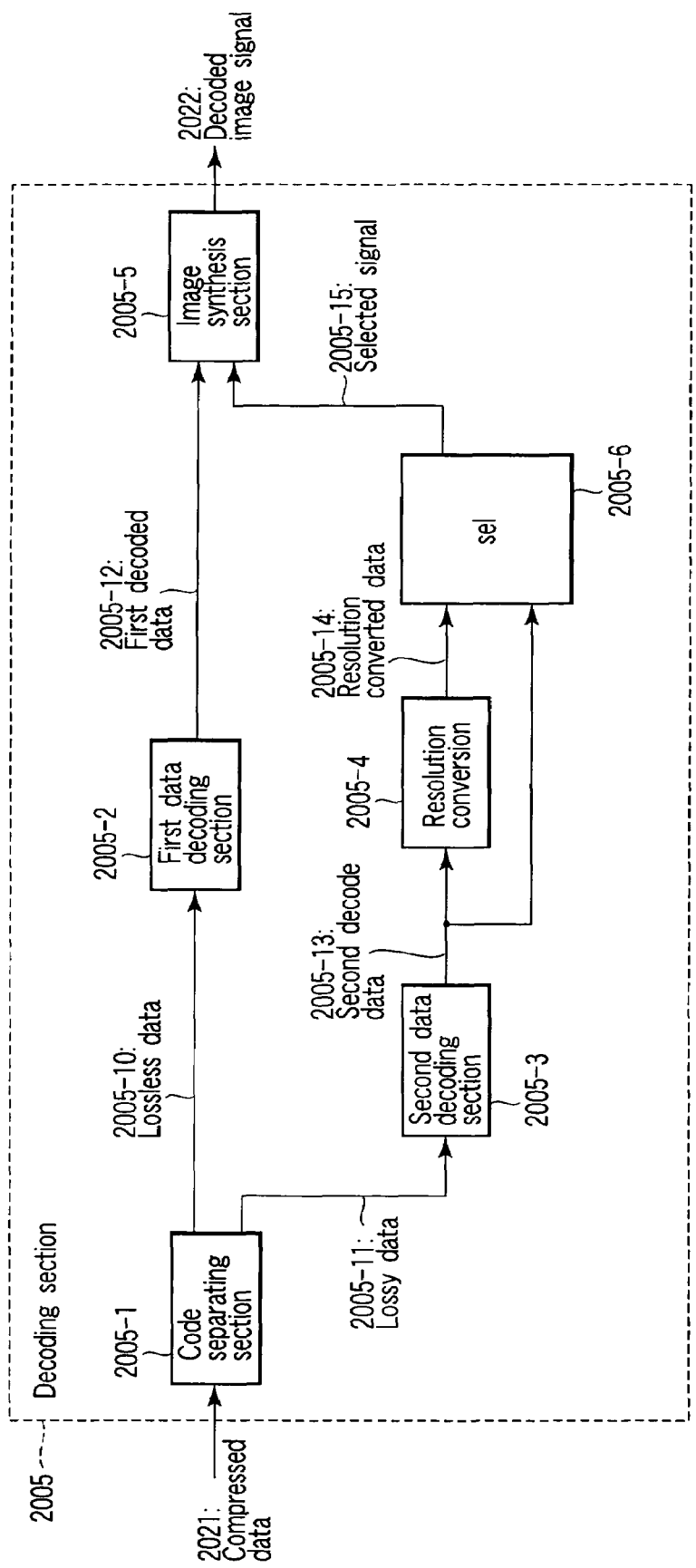
FIG. 18 is a circuit diagram showing a configuration example of a decoding section of the image processing apparatus shown in FIG. 16.

FIG. 18 is the circuit diagram showing the configuration of the decoding section 2005 of the image processing apparatus 2000 in FIG. 16. The basic configuration of the decoding section 2005 is the same as that of the coding section 1005 of the image processing apparatus 1000 shown in FIG. 1 except for the addition of the selector 2005-6.

The compressed data 2021 supplied to a decoding section 2005 is supplied to a code separation section 2005-1 in the decoding section 2005. The compressed data 2021 supplied to the code separation section 2005-1 is separated to lossless data 2005-10 and lossy data 2005-11. A first data decoding section 2005-2 decodes the supplied lossless data 2005-10 as 16×16-pixel when the lossless data 2005-10 is data with a resolution of 1,200 dpi or as 8×8-pixel when the lossless data 2005-10 is data with a resolution of 600 dpi to output it to an image synthesis section 2005-5.

The lossy data 2005-11 is decoded to second decoded data 2005-13 by a second data decoding section 2005-3 to be output to a resolution conversion section 2005-4 and a selector (sel) 2005-6, respectively. The resolution conversion section 2005-4 converts the supplied second coded data 2005-13 to resolution-converted data 2005-14 of 16×16-pixel to output it to the selector (sel) 2005-6. When the compressed data 2021 supplied to the decoding section 2005 is the data with the resolution of 1,200 dpi, the selector 2005-6 selects the resolution converted data 2005-14 and when the compressed data 2021 supplied to decoding section 2005 is the data with the resolution of 600 dpi, the selector 2005-6 selects the second decoded data 2005-13 to output it as selected output data 2005-15 to the image synthesis section 2005-5.

The image synthesis section 2005-5 synthesizes the supplied first decoded 2005-12 and the selected output data 2005-15 to output a decoded image signal 2022.

Here, if the compressed data 2021 supplied to the decoding section 2005 is the data of the resolution with 1,200 dpi, the image synthesis section 2005-5 performs image synthesis by the operation shown in FIG. 10.

Figure 19:
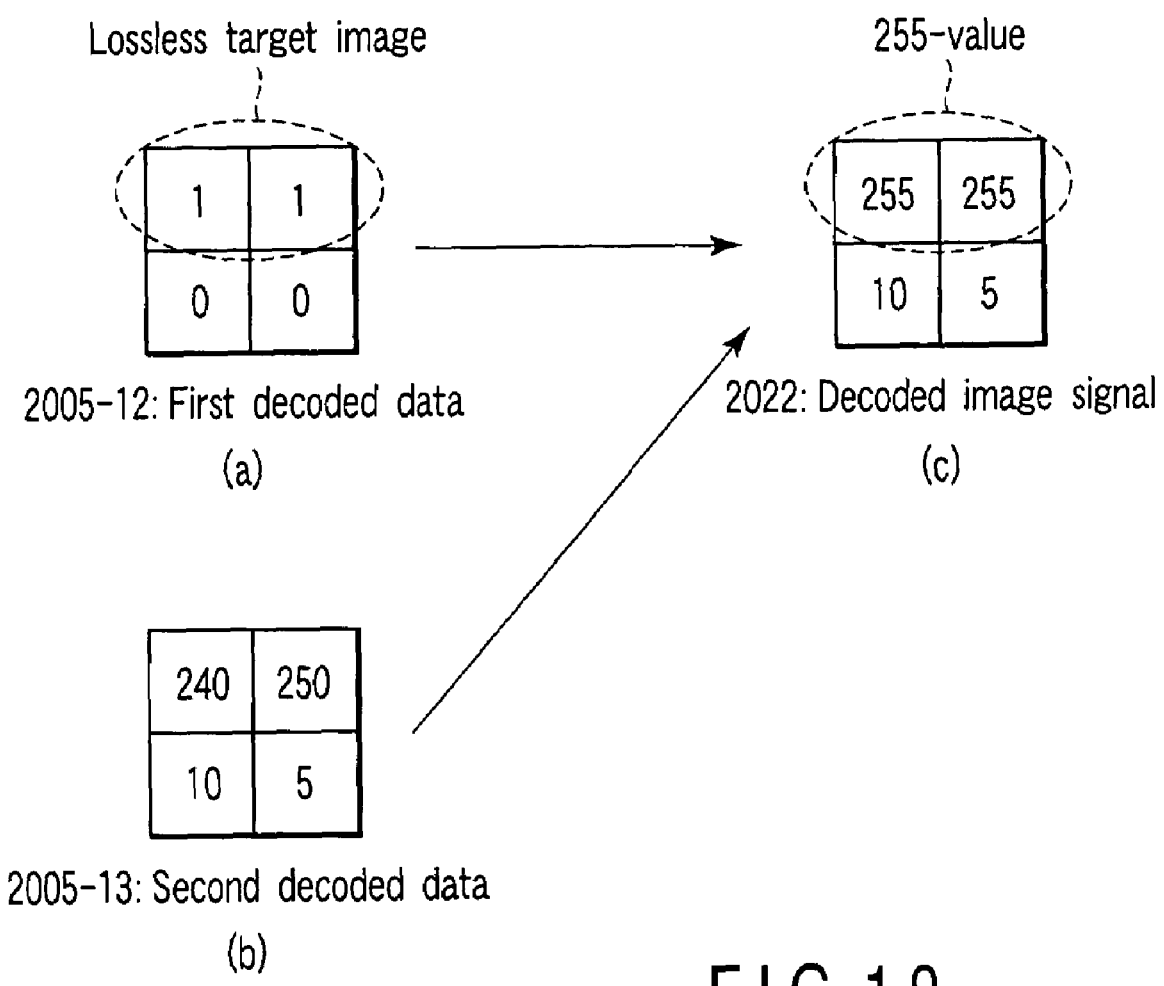
FIG. 19 is an explanation view explaining an operation of an image synthesis section of the decoding section shown in FIG. 18.

If the compressed data 2021 supplied to the decoding section 2005 is the data of the resolution of 600 dpi, the image synthesis section 2005-5 displaces lossless target pixels with respective 255-pixel values as shown in FIG. 19.

FIG. 19 is an explanation view showing the operation of the image synthesis section 2005-5 in the case that the compressed data 2021 supplied to the decoding section 2005 is the data of the resolution with 600 dpi. In this case, the selected signal 2005-15 is the second decoded data 2005-13.

The (a) of FIG. 19 shows the first decoded data 2005-12 supplied to the image synthesis section 2005-5. Spots expressed by "1" indicate lossless target pixels. The (b) of FIG. 19 shows the second decoded data 2005-13 supplied to the image synthesis section 2005-5. At processing units, if the first decoded data 2005-12 is "1", 255-pixel value is output as an output, if the first decoded data 2005-12 is "0", the value of the second decoded data 2005-13 is output. The (c) of FIG. 19 shows the decoded image signal.

Therefore, according to the above-described embodiment, a device to process data with a plurality of resolutions can treat data with different resolutions, with a simple configuration. Accordingly, the present invention can be easily applied to a printer having printing modes with 600 dpi and 1,200 dpi.

As described above, the present invention is specified by the following configurations (1a)-(1f).

(1a) An image data decoding apparatus for decoding synthesized-compressed data in which image data with a plurality of resolutions is compressed in block units by different compression systems, respectively, and each compressed data is synthesized to a single piece of compressed data basically comprises:

(1b) the separating section 1005-1 for separating the synthesized-compressed data into compressed data with every resolution;

(1c) the decoding sections 1005-2, 1005-3 for decoding compressed data with a first resolution obtained from the separating section to obtain first high-resolution data and also decoding compressed data with a second resolution obtained from the separating section to obtain first low-resolution data;

(1d) the conversion section 1005-4 for converting the first low-resolution data into a second high-resolution data; and (1e) the image synthesis section 1005-5 for synthesizing the first and the second high-resolution data to obtain a decoded image signal. Thereby, the image data decoding apparatus can extract data in block units to decode it, so that decoded data can be simply treated.

(2) In the present invention, in addition to the above-mentioned basic configuration, the decoding section includes the first decoding section 1005-2 to obtain the first high-resolution data and the second decoding section 1005-3 to obtain the first low-resolution data.

(3) In the present invention, in addition to the above-mentioned basic configuration, the decoding sections 1005-2, 1005-3 decode a black (K) signal as the compressed data with the first resolution and decode a Cyan (C) Magenta (M) Yellow (Y) signal as the compressed data with the second resolutions. Thereby, since the K signal relatively important more than the CMY signal can be decoded at a high-resolution, the image quality of the decoded data is improved.

(4) Furthermore, in addition to the above-mentioned basic configuration, in the present invention, the decoding section 1012 obtains the first low-resolution data in which the first high-resolution data is used for a correction when decoding the compressed data with the second resolution. Thereby, since data created for a high-resolution engine can be converted into low-resolution and high-quality data, the converted data can be used for a low-resolution engine and this image data decoding apparatus becomes applicable to wider field.

(5) Furthermore, in the present invention, in addition to the above-described, the decoding section 1012 uses the first high-resolution data as a signal to control printing position. Thereby, the image data decoding apparatus can obtain the decoded data excellent in image quality even by using low-resolution data.

(6) In the present invention, in addition to the above-described basic configuration, the separating section 1005-1 separates image feature quantity data, and the first decoding section creates interpolation data for the data with the first resolution by using the image future quantity data. Therefore, since the image data decoding apparatus decodes the image data by using the feature quantity data with the resolution higher than that of the image, the image quality of the decoded data is improved.

(7) In the present invention, in addition to the above-described basic configuration, the image data decoding apparatus further comprises a storage section 1030 storing the synthesized-compressed data and a decoding section selecting to decode only data with a prescribed resolution included in the synthesized-compressed data read out from the storage section. Thereby, since both different-resolution coexisting compressed data and single-resolution compressed data can be decode by simply switching, the image data decoding apparatus can be reduced in cost.

The present invention is specified by the following configurations (8a)-(8g).

(8a) An image data decoding apparatus for decoding first synthesized-compressed data in which image data with a plurality of resolutions is compressed by block unit in different compression systems, respectively, so that each compressed data is synthesized to a single piece of compressed data and second synthesized-compressed data with the same form as that of the first synthesized-compressed data in which image data with the same resolutions is compressed by block in different compression systems, respectively, so that each compressed data is synthesized to a single piece of compressed data and comprises:

(8b) the separating section 1005-1 for separating the first synthesized-compressed data to the lossless data and the lossy data;

(8c) the first decoding section 1005-2 for decoding the lossless data obtained from the separation section to obtain first decoded data;

(8d) the second decoding section 1005-3 for decoding the lossy data obtained from the separation section to obtain second decoded data;

(8e) the conversion section 1005-4 for converting the second decoded data into resolution-converted data with a high resolution;

(8f) the selector 2005-6 for selecting to output either the resolution converted data from the conversion section or the second decoded data from the second decoding section; and (9g) the image synthesis section 1005-5 for synthesizing the first decoded data from the first decoding section and the second decoded data from the second decoding section to obtain a single decoded image signal. Thereby, since both different-resolution coexisting compressed data and single-resolution compressed data can be decoded by simply switching, the image data decoding apparatus can be reduced in cost.

(9) The synthesized-compressed data is switched to a fixed data length type with code length adjustment data added thereto and a variable data length type with adjustment data having a code data length deleted therefrom in accordance with the storage destination. Thereby, since the synthesized-compressed data can be converted from the data with fixed data length into the data with variable data length, data storage performance is improved.

The above-mentioned means separates the image data into the lossless and lossy data, respectively compresses each image data by the different compression systems and creates a single piece of compressed data by getting together each compressed data. And in the coding processing, the above-described configurations are effectively utilized. Therefore, the image data decoding apparatus can efficiently decode the compressed data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image data decoding apparatus for decoding synthesized-compressed data in which image data with a plurality of resolutions is compressed in block units by different compression systems, respectively, and each compressed data is synthesized to a single piece of compressed data, comprising:
   a separating section for separating the synthesized-compressed data into compressed data with each resolution;
   a decoding section for decoding compressed data with a first resolution obtained from the separating section to obtain first high-resolution data and also decoding compressed data with a second resolution obtained from the separating section to obtain first low-resolution data;
   a conversion section for converting the first low-resolution data into second high-resolution data; and
   an image synthesis section for synthesizing the first and the second high-resolution data to obtain a decoded image signal.

2. The image data coding apparatus according to claim 1, wherein
the decoding section includes a first decoding section for obtaining the first high-resolution data and a second decoding section for obtaining the first low-resolution data.

3. The image data decoding apparatus according to claim 1, wherein
the decoding section includes a processing section for decoding a black (K) signal as the compressed data with the first resolution and decoding a Cyan (C) Magenta (M) Yellow (Y) signal as the compressed data with the second resolution.

4. The image data decoding apparatus according to claim 1, wherein
the decoding section includes a processing section for obtaining the first low-resolution data in which the first high-resolution data is used for a correction when decoding the compressed data with the second resolution.

5. The decoding apparatus according to claim 4, wherein
the decoding section uses the first high-resolution data as a signal to control printing position.

6. The image data decoding apparatus according to claim 1, wherein
the separating section separates image feature quantity data; and
the first decoding section includes a processing section for creating interpolation data for the data with the first resolution by using the image future quantity data.

7. The image data decoding apparatus according to claim 1, further comprising:
a storage section for storing the synthesized-compressed data and;
a decoding section for selectively decoding only data with a prescribed resolution included in the synthesized-compressed data read out from the storage section.

8. The image data decoding apparatus according to claim 1, wherein the synthesized-compressed data is switched between a fixed data length type with code length adjustment data added thereto and a variable data length type with adjustment data of a code data length deleted therefrom in accordance with a storage destination.

9. An image data decoding apparatus for decoding first synthesized-compressed data in which image data with a plurality of resolutions is compressed in block units by different compression systems, respectively, so that each compressed data is synthesized to a single piece of compressed data and second synthesized-compressed data with the same form as that of the first synthesized-compressed data in which image data with the same resolution is compressed in block units by different compression systems, respectively, so that each compressed data is synthesized to a single piece of compressed data, comprising:
a separating section for separating the first synthesized-compressed data to lossless data and lossy data;
a first decoding section for decoding the lossless data obtained from the separation section to obtain first decoded data;
a second decoding section for decoding the lossy data obtained from the separation section to obtain second decoded data;
a conversion section for converting the second decoded data into resolution-converted data with a high resolution;
a selector for selecting to output either the resolution-converted data from the conversion section or the second decoded data from the second decoding section; and
an image synthesis section for synthesizing the first decoded data from the first decoding section and the selectively output data from the selector to obtain a single decoded image signal.

10. An image data decoding method for decoding synthesized-compressed data in which image data with a plurality of resolutions is compressed in block units by different compression systems, respectively, and each compressed data is synthesized to a single piece of compressed data, comprising:
separating the synthesized-compressed data into compressed data with each resolution by a separating section;
decoding compressed data with a first resolution obtained from the separating section to obtain first high-resolution data and also decoding compressed data with a second resolution obtained from the separating section to output first low-resolution data by a decoding section;
converting the first low-resolution data into second high-resolution data by a conversion section; and
synthesizing the first and the second high-resolution data to obtain a single decoded image signal by an image synthesis section.

11. The image data decoding method according to claim 10, wherein
the decoding section decodes a black (K) signal as the compressed data with the first resolution; and
decodes a Cyan (C) Magenta (M) Yellow (Y) signal as the compressed data with the second resolution.

12. The image data decoding method according to claim 10, wherein
the decoding section obtains the first low-resolution data in which the first high-resolution data is used for a correction when decoding the compressed data with the second resolution.

13. The image data decoding method according to claim 10, wherein
the decoding section uses the first high-resolution data as a signal for controlling a printing position.

14. The image data decoding method according to claim 10, wherein
the separating section separates image feature quantity data; and
the first decoding section utilizes the image feature quantity data to create interpolation data for the compressed data with the first resolution.

15. The image data decoding method according to claim 10, further selectively decoding only data with a prescribed resolution included in synthesized-compressed data read out from a storage section.

* * * * *